United States Patent
Chiu et al.

(10) Patent No.: US 9,084,327 B2
(45) Date of Patent: Jul. 14, 2015

(54) DRIVER CIRCUIT FOR IMPROVING UTILIZATION RATE OF LED DEVICE AND RELATED CONSTANT CURRENT REGULATOR

(71) Applicant: Richtek Technology Corporation, Hsinchu County (TW)

(72) Inventors: Kuo-Chin Chiu, Hsinchu County (TW); Chih-Feng Huang, Hsinchu County (TW)

(73) Assignee: Richtek Technology Corporation, Zhubei City (TW)

( * ) Notice: Subject to any disclaimer, the term of this patent is extended or adjusted under 35 U.S.C. 154(b) by 203 days.

(21) Appl. No.: 13/789,325

(22) Filed: Mar. 7, 2013

(65) Prior Publication Data

US 2013/0271041 A1 Oct. 17, 2013

(30) Foreign Application Priority Data

Apr. 12, 2012 (TW) .............................. 101112919 A

(51) Int. Cl.
    *H05B 33/08* (2006.01)
(52) U.S. Cl.
    CPC .......... *H05B 33/0851* (2013.01); *H05B 33/083* (2013.01); *H05B 33/0854* (2013.01)
(58) Field of Classification Search
    USPC ...... 315/185 R, 188, 192, 291, 294, 307, 308
    See application file for complete search history.

(56) References Cited

U.S. PATENT DOCUMENTS

| 7,081,722 | B1 * | 7/2006 | Huynh et al. | 315/323 |
| 8,823,285 | B2 * | 9/2014 | Chobot | 315/307 |
| 2008/0224632 | A1 * | 9/2008 | Noda | 315/291 |
| 2009/0289559 | A1 * | 11/2009 | Tanaka et al. | 315/185 R |
| 2011/0309758 | A1 * | 12/2011 | Yu et al. | 315/192 |
| 2012/0081016 | A1 * | 4/2012 | Wu et al. | 315/192 |

* cited by examiner

*Primary Examiner* — Douglas W Owens
*Assistant Examiner* — Thai Pham
(74) *Attorney, Agent, or Firm* — Birch, Stewart, Kolasch & Birch, LLP

(57) ABSTRACT

A driver circuit for driving an LED array is disclosed. The LED array includes a first, a second, a third, a fourth LED device and a diode device. The second LED device is connected to the first LED device. The fourth LED device is connected to the third LED device. The diode device is connected between the second LED device and the third LED device. The driver circuit includes a first constant current regulator for coupling between the first and the second LED device; a second constant current regulator for coupling between the second and the third LED device; a third constant current regulator for coupling between the third and the fourth LED device; a fourth constant current regulator for coupling between the fourth LED device and a fixed-voltage terminal; and a control circuit coupled with the first, the second, the third, and the fourth constant current regulators.

27 Claims, 4 Drawing Sheets

DRIVER CIRCUIT FOR IMPROVING UTILIZATION RATE OF LED DEVICE AND RELATED CONSTANT CURRENT REGULATOR

CROSS-REFERENCE TO RELATED APPLICATIONS

This application claims the benefit of priority to Patent Application No. 101112919, filed in Taiwan on Apr. 12, 2012; the entirety of which is incorporated herein by reference for all purposes.

BACKGROUND

The disclosure generally relates to a driver circuit and, more particularly, to a driver circuit for improving luminous efficacy of a LED device and related constant current regulators.

Many traditional luminance devices that utilize LED devices as a light source drive the LED devices by using electricity from AC power source. Therefore, an electrolytic capacitor is typically arranged in a voltage input path in order to improve the luminous efficacy of the LED devices. The durable time of the electrolytic capacitor, however, is typically shorter than that of the LED devices. Once the electrolytic capacitor malfunctions, the traditional luminance device is unable to operate normally. Apparently, the use of the electrolytic capacitor in the luminance device not only causes adverse influence to a power factor of the luminance device, but also reduces reliability and durable time of the luminance device.

SUMMARY

In view of the foregoing, it can be appreciated that a substantial need exists for apparatuses that can improve a power factor and reliability of a luminance device while improving the utilization rate of LED devices in the luminance device.

An example embodiment of a driver circuit for driving a LED array is disclosed. The LED array comprises: a first LED device, a second LED device, a third LED device, a fourth LED device, and a first diode device, wherein the second LED device is connected to the first LED device, the fourth LED device is connected to the third LED device, and the first diode device is connected between the second LED device and the third LED device. The driver circuit comprises: a first constant current regulator for coupling between the first LED device and the second LED device; a second constant current regulator for coupling between the second LED device and the third LED device; a third constant current regulator for coupling between the third LED device and the fourth LED device; a fourth constant current regulator for coupling between the fourth LED device and a fixed-voltage terminal; and a control circuit coupled with the first, the second, the third, and the fourth constant current regulators; wherein when an input voltage of a target constant current regulator of the first, the second, the third, and the fourth constant current regulators exceeds a corresponding threshold voltage, the target constant current regulator reduces a current flowing through the target constant current regulator to be lower than a predetermined threshold value under control of the control circuit.

Another example embodiment of the driver circuit for driving the LED array is disclosed. The LED array comprises: a first LED device, a second LED device, a third LED device, a fourth LED device, a first diode device, and a first switch, wherein the second LED device is connected to the first LED device, the fourth LED device is connected to the third LED device, the first diode device is connected between the second LED device and the third LED device, and the first switch is connected between the third LED device and the first LED device. The driver circuit comprises: a first constant current regulator for coupling between the first LED device and the second LED device; a second constant current regulator for coupling between the second LED device and the third LED device; a third constant current regulator for coupling between the third LED device and the fourth LED device; a fourth constant current regulator for coupling between the fourth LED device and a fixed-voltage terminal; and a control circuit coupled with the first, the second, the third, and the fourth constant current regulators; wherein when an input voltage of a target constant current regulator of the first, the second, the third, and the fourth constant current regulators exceeds a corresponding threshold voltage, the target constant current regulator reduces a current flowing through the target constant current regulator to be lower than a predetermined threshold value under control of the control circuit, and when an input voltage of the LED array is between a second threshold voltage and a third threshold voltage, the control circuit turns off the first switch.

Another example embodiment of the driver circuit for driving the LED array is disclosed. The LED array comprises: a first LED device, a second LED device, a third LED device, a fourth LED device, and a first diode device, wherein the second LED device is connected to the first LED device, the fourth LED device is connected to the third LED device, and the first diode device is connected between the second LED device and the third LED device. The driver circuit comprises: a first switch for coupling between the third LED device and the first LED device; a first constant current regulator for coupling between the first LED device and the second LED device; a second constant current regulator for coupling between the second LED device and the third LED device; a third constant current regulator for coupling between the third LED device and the fourth LED device; a fourth constant current regulator for coupling between the fourth LED device and a fixed-voltage terminal; and a control circuit coupled with the first, the second, the third, and the fourth constant current regulators; wherein when an input voltage of a target constant current regulator of the first, the second, the third, and the fourth constant current regulators exceeds a corresponding threshold voltage, the target constant current regulator reduces a current flowing through the target constant current regulator to be lower than a predetermined threshold value under control of the control circuit, and when an input voltage of the LED array is between a second threshold voltage and a third threshold voltage, the control circuit turns off the first switch.

One of the advantages of the previous driver circuit is that the utilization rate of the LED devices in the LED array can be greatly improved, thereby increasing the luminous efficacy of the LED array.

Another advantage of the previous driver circuit is that the driver circuit is beneficial to the durable time of the LED devices while reducing flicker in the LED devices.

An example embodiment of a constant current regulator is disclosed comprising: a first transistor, wherein a first terminal of the first transistor is coupled with an input voltage; a second transistor, wherein a first terminal of the second transistor is coupled with a second terminal and a control terminal of the first transistor; a third transistor, wherein a first terminal of the third transistor is coupled with the first terminal of the first transistor, and a control terminal of the third transistor is coupled with the first terminal of the second transistor; a first resistor, wherein a first terminal of the first resistor is coupled with a second terminal of the third transistor, and a second terminal of the first resistor is coupled with a control terminal of the second transistor; a second resistor, wherein a first terminal of the second resistor is coupled with the control terminal of the second transistor, and a second terminal of the second resistor is coupled with a second terminal of the second transistor; and a third resistor, wherein a first terminal of the third resistor is coupled with the second terminal of the third transistor, and a second terminal of the third resistor is coupled with a fixed-voltage terminal.

Other advantages of the present disclosure will be further explained by the following description and drawings.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to . . . ." Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Figure 1:
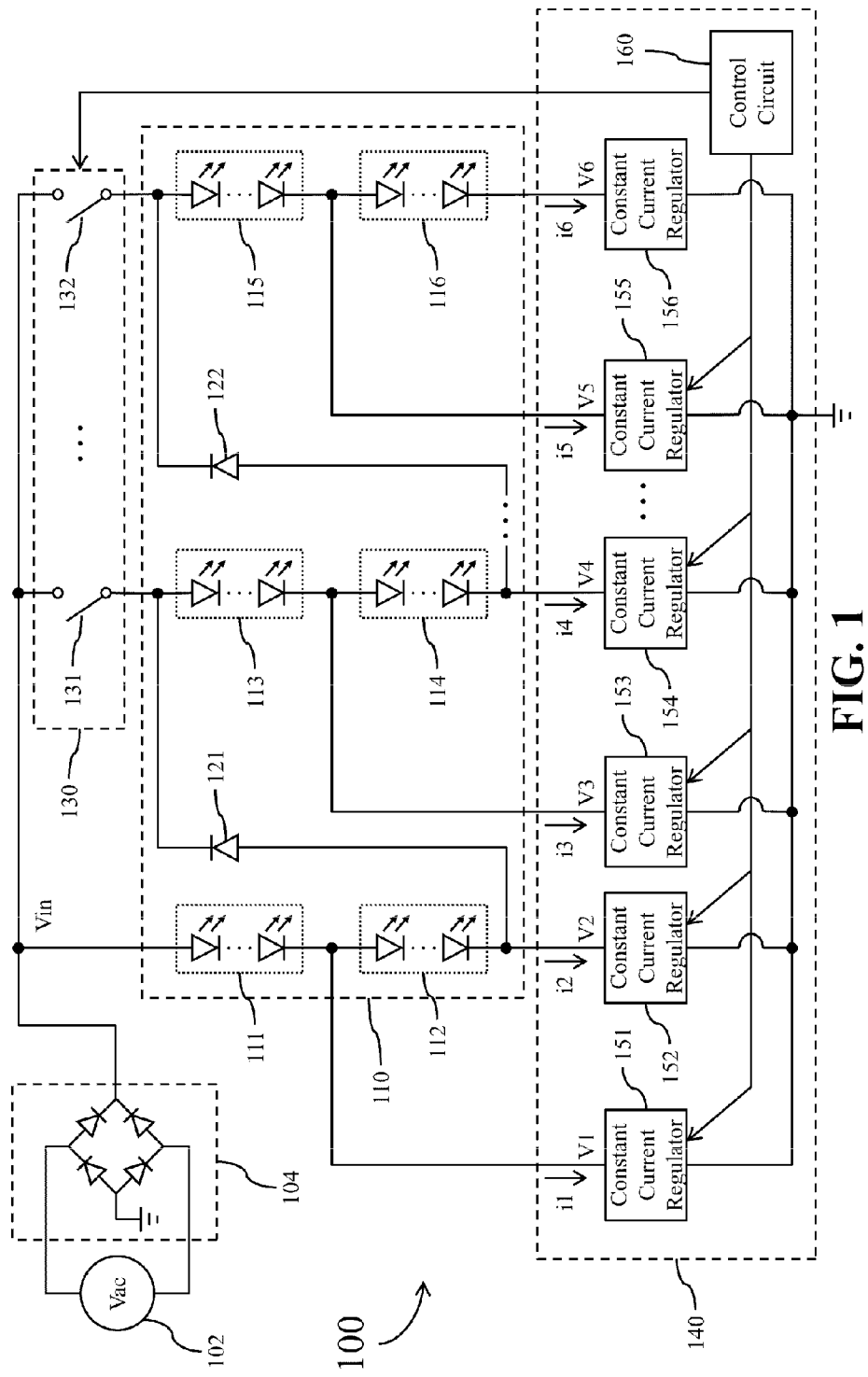
FIG. 1 is a simplified functional block diagram of a luminance device in accordance with an example embodiment.

FIG. 1 is a simplified functional block diagram of the luminance device 100 in accordance with an example embodiment. The luminance device 100 comprises an A/C source 102, a bridge rectifier 104, a LED array 110, a switch array 130, and a driver circuit 140. The bridge rectifier 104 is configured to operably convert an AC voltage Vac supplied from the A/C source 102 into an input voltage Vin having m-shaped waves, and to provide the input voltage Vin to the LED array 110. Both the switch array 130 and the driver circuit 140 are coupled with the LED array 110.

The LED array 110 comprises a plurality of LED devices and one or more diode devices, and the switch array 130 comprises one or more switches. For example, in the embodiment of FIG. 1, the LED array 110 comprises a first LED device 111, a second LED device 112, a third LED device 113, a fourth LED device 114, a fifth LED device 115, a sixth LED device 116, a first diode device 121, and a second diode device 122. The LED device 112 is connected to the LED device 111. The LED device 114 is connected to the LED device 113. The LED device 116 is connected to the LED device 115. The diode device 121 is connected between the LED device 112 and the LED device 113. The diode device 122 is coupled between the LED device 115 and another LED device in the LED array 110. For example, if the LED array 110 comprises only six LED devices 111~116, the diode device 122 is connected between the LED device 115 and the LED device 114. In the LED array 110, each LED device may be realized with one or more LED components, and each diode device may be realized with one or more diode components.

In the embodiment of FIG. 1, the switch array 130 comprises a first switch 131 and a second switch 131 in a parallel connection configuration. The switch 131 is connected between the LED device 113 and the LED device 111. The switch 132 is connected between the LED device 115 and the LED device 111.

In operations, the driver circuit 140 dynamically adjusts current paths of the LED devices 111~116 in the LED array 110 by controlling operations of each switch in the switch array 130 to switch the LED devices 111~116 between a parallel connection configuration and a series connection configuration. Such structure effectively improves utilization rate of these LED devices, thereby improving luminous efficacy of the LED array 110.

In the embodiment of FIG. 1, the driver circuit 140 comprises a first constant current regulator 151, a second constant current regulator, a third constant current regulator 153, a fourth constant current regulator 154, a fifth constant current regulator 155, a sixth constant current regulator 156, and a control circuit 160. The constant current regulator 151 is utilized for coupling between the LED device 111 and the LED device 112. The constant current regulator 152 is utilized for coupling between the LED device 112 and the LED device 113. The constant current regulator 153 is utilized for coupling between the LED device 113 and the LED device 114. The constant current regulator 154 is utilized for coupling between the LED device 114 and a fixed-voltage terminal, such as a grounded terminal. The constant current regulator 155 is utilized for coupling between the LED device 115 and the LED device 116. The constant current regulator 156 is utilized for coupling between the LED device 116 and a fixed-voltage terminal, such as a grounded terminal.

A or the purpose of explanatory convenience in the following description, the term "target constant current regulator" is used throughout the description and following claims to refer an unspecific constant current regulator in the constant current regulators 151~156. When an input voltage of a target constant current regulator in the constant current regulators 151~156 exceeds a corresponding threshold voltage, the target constant current regulator reduces a current flowing through the target constant current regulator to be lower than a predetermined threshold value under control of the control circuit 160. For example, the target constant current regulator may reduce the current flowing through the target constant current regulator to be 0. In an embodiment, when an input voltage V1 of the constant current regulator 151 exceeds a first threshold voltage Vb1, the constant current regulator 151 reduces a current i1 flowing through the constant current regulator 151 to be lower than the predetermined threshold value under control of the control circuit 160. When an input voltage V2 of the constant current regulator 152 exceeds a second threshold voltage Vb2, the constant current regulator 152 reduces a current i2 flowing through the constant current regulator 152 to be lower than the predetermined threshold value under control of the control circuit 160. When an input voltage V3 of the constant current regulator 153 exceeds a third threshold voltage Vb3, the constant current regulator 153 reduces a current i3 flowing through the constant current regulator 153 to be lower than the predetermined threshold value under control of the control circuit 160. When an input voltage V4 of the constant current regulator 154 exceeds a fourth threshold voltage Vb4, the constant current regulator 154 reduces a current i4 flowing through the constant current regulator 154 to be lower than the predetermined threshold value under control of the control circuit 160. When an input voltage V5 of the constant current regulator 155 exceeds a fifth threshold voltage Vb5, the constant current regulator 155 reduces a current i5 flowing through the constant current regulator 155 to be lower than the predetermined threshold value under control of the control circuit 160. When an input voltage V6 of the constant current regulator 156 exceeds a sixth threshold voltage Vb6, the constant current regulator 156 reduces a current i6 flowing through the constant current regulator 156 to be lower than the predetermined threshold value under control of the control circuit 160. Relative magnitude of the previous threshold voltages Vb1~Vb6 is Vb6>Vb5>Vb4>Vb3>Vb2>Vb1.

Figure 2:
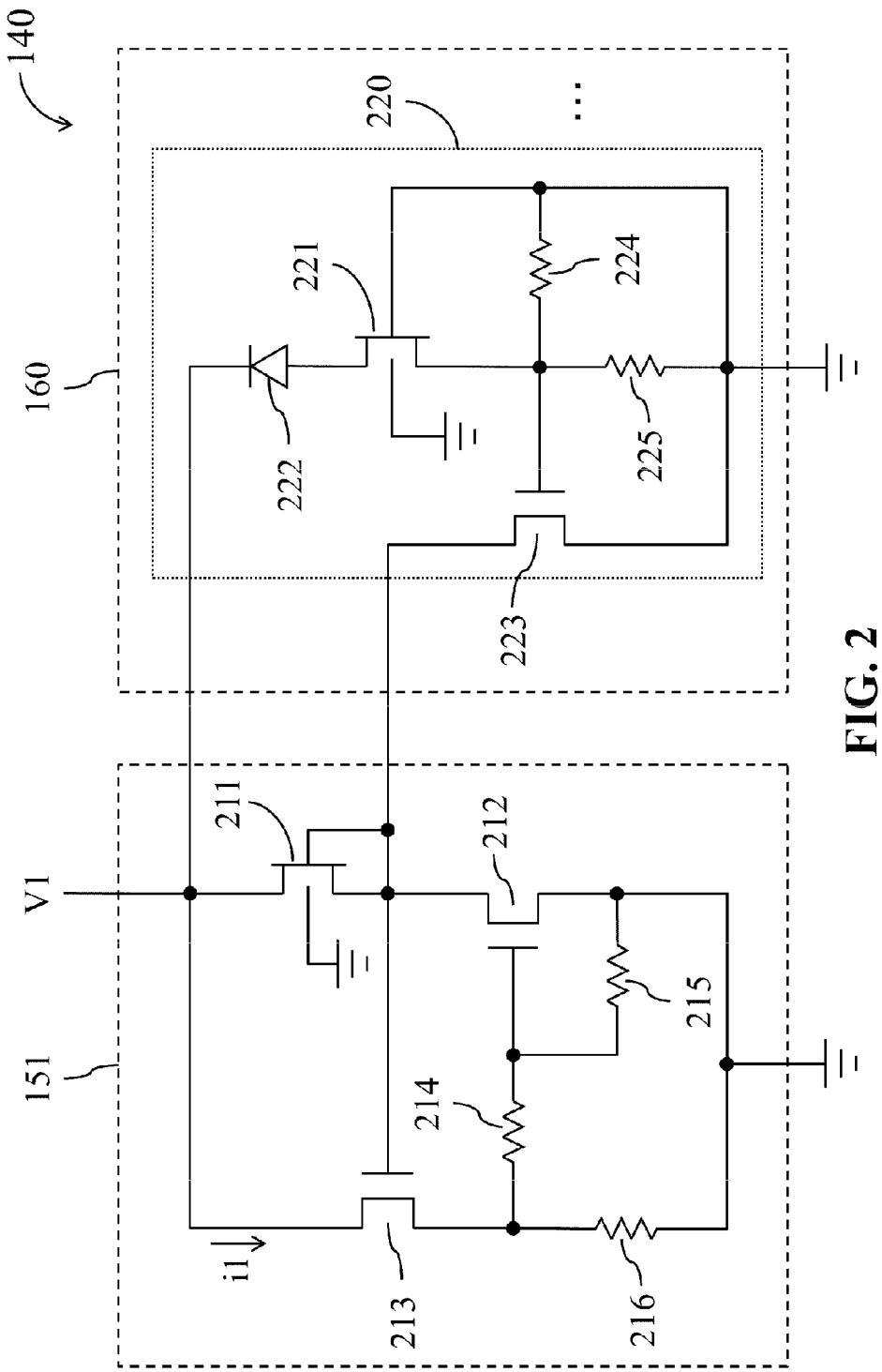
FIG. 2 is a partial functional block diagram of a driver circuit of FIG. 1 in accordance with an example embodiment.

FIG. 2 shows a partial functional block diagram of the driver circuit 140 of FIG. 1 in accordance with an example embodiment. For the purpose of explanatory convenience in the following description, FIG. 2 takes the constant current regulator 151 as an example to illustrate an embodiment of each constant current regulator in the driver circuit 140.

In this embodiment, the constant current regulator 151 comprises a first transistor 211, a second transistor 212, a third transistor 213, a first resistor 214, a second resistor 215, and a third resistor 216. A first terminal of the first transistor 211 is coupled with the input voltage V1 of the constant current regulator 151. A first terminal of the second transistor 212 is coupled with a second terminal and a control terminal of the first transistor 211. A first terminal of the third transistor 213 is coupled with the first terminal of the first transistor 211, and a control terminal of the third transistor 213 is coupled with the first terminal of the second transistor 212. A first terminal of the first resistor 214 is coupled with a second terminal of the third transistor 213, and a second terminal of the first resistor 214 is coupled with a control terminal of the second transistor 212. A first terminal of the second resistor 215 is coupled with the control terminal of the second transistor 212, and a second terminal of the second resistor 215 is coupled with a second terminal of the second transistor 212. A first terminal of the third resistor 216 is coupled with the second terminal of the third transistor 213, and a second terminal of the third resistor 216 is coupled with a fixed-voltage terminal.

In this embodiment, the control circuit 160 of the driver circuit 140 comprises a plurality of detection circuits, respectively coupled with the constant current regulators 151~156 in the driver circuit 140, for detecting respective input voltages of the constant current regulators 151~156. As shown in FIG. 2, the detection circuit 220 of the control circuit 160 for controlling the constant current regulator 151 comprises a fourth transistor 221, a third diode device 222, a fifth transistor 223, a fourth resistor 224, and a fifth resistor 225. The diode device 222 comprises one or more diode components and coupled between a first terminal of the transistor 221 and the input voltage V1 of the constant current regulator 151. A first terminal of the fifth transistor 223 is coupled with the control terminal of the transistor 213 in the constant current regulator 151, and a control terminal of the fifth transistor 223 is coupled with a second terminal of the fourth transistor 221. A first terminal of the fourth resistor 224 is coupled with the control terminal of the fifth transistor 223, and a second terminal of the fourth resistor 224 is coupled with a control terminal of the fourth transistor 221. A first terminal of the fifth resistor 225 is coupled with the control terminal of the fifth transistor 223, and a second terminal of the fifth resistor 225 is coupled with a fixed-voltage terminal. The threshold voltage Vb1 of the constant current regulator 151 is determined by a breakdown voltage of the diode device 222.

In implementations, the transistors 212 and 213 in the constant current regulator 151 may be realized with two transistors of the same type or may be realized with two transistors of different types. Similarly, the transistors 221 and 223 in the detection circuit 220 may be realized with two transistors of the same type or may be realized with two transistors of different types. For example, in an embodiment, the transistor 221 in the detection circuit 220 and the transistor 211 in the constant current regulator 151 may be realized with JFETs, and other transistors in the detection circuit 220 and the constant current regulator 151 may be realized with MOS transistors.

When the input voltage V1 of the constant current regulator 151 is less than the breakdown voltage of the diode device 222, the second terminal of the transistor 221 in the detection circuit 220 is at a low voltage level. In this situation, the transistor 223 is turned off, and the current i1 flowing through the constant current regulator 151 remains substantially the same.

When the input voltage V1 of the constant current regulator 151 is greater than the breakdown voltage of the diode device 222, the input voltage V1 breaks through the diode device 222 and therefore the second terminal of the transistor 221 switches to a high voltage level and turns on the transistor 223. As a result, the transistor 213 in the constant current regulator 151 is turned off. In this situation, the current i1 flowing through the constant current regulator 151 reduces to 0. In implementations, the constant current regulators 152~156 may be realized with the same structure as the previous constant current regulator 151 to reduce the complexity of circuit control.

Similarly, other detection circuits of the control circuit 160 for controlling the constant current regulators 152~156 may be realized with the same structure as the previous detection circuit 220. Since threshold voltages of the constant current regulators 151~156 are different, the diode devices in other detection circuits should be correspondingly adjusted so as to match the breakdown voltage of the diode device with the threshold voltage of the corresponding constant current regulator. For example, since the threshold voltage Vb2 of the constant current regulator 152 is greater than the threshold voltage Vb1 of the constant current regulator 151, the breakdown voltage of the diode device in the corresponding detection circuit of the constant current regulator 152 should be greater than the breakdown voltage of the previous diode device 222. In another example, since the threshold voltage Vb6 of the constant current regulator 156 is greater than the threshold voltage Vb5 of the constant current regulator 155, the breakdown voltage of the diode device in the corresponding detection circuit of the constant current regulator 156 should be greater than the breakdown voltage of the diode device in the corresponding detection circuit of the constant current regulator 155.

The descriptions regarding circuit operations between the constant current regulator 151 and the detection circuit 220 are also applicable to the constant current regulators 152~156 and the corresponding detection circuits. For simplicity, the descriptions will not be repeated here.

In some embodiments, the detection circuit for controlling the constant current regulator 156 may be omitted from the control circuit 160 while only the detection circuits respectively corresponding to the constant current regulators 151~155 are arranged in the control circuit 160 in order to reduce required circuit area.

As illustrated in the foregoing descriptions, the driver circuit 140 dynamically adjusts current paths of the LED devices 111~116 in the LED array 110 by controlling operations of each switch in the switch array 130 to switch the LED devices 111~116 between a parallel connection configuration and a series connection configuration. For the purpose of explanatory convenience in the following descriptions, it is assumed hereinafter that the LED devices 111~116 have the same forward voltage VF, and the diode devices 121 and 122 have the same forward voltage VFD.

When the input voltage Vin of the LED array 110 is greater than VF but less than the threshold voltage Vb1 of the constant current regulator 151, the control circuit 160 in the driver circuit 140 turns on the switch 131 and switch 132 in the switch array 130, so that an output current of the bridge rectifier 104 flows to the constant current regulator 151 through the LED device 111, flows to the constant current regulator 153 through the LED device 113, and flows to the constant current regulator 155 through the LED device 115. In this situation, the LED devices 111, 113, and 115 illuminate and form a parallel connection configuration.

When the input voltage Vin of the LED array 110 is greater than 2 VF but less than the threshold voltage Vb2 of the constant current regulator 152, the constant current regulator 151 reduces the current i1 flowing through the constant current regulator 151 to be 0 under control of the control circuit 160, and the control circuit 160 turns on the switch 131 and switch 132 in the switch array 130. As a result, the output current of the bridge rectifier 104 flows to the constant current regulator 152 through the LED devices 111 and 112, flows to the constant current regulator 154 through the LED devices 113 and 114, and flows to the constant current regulator 156 through the LED devices 115 and 116. In this situation, all of the LED devices 111~116 illuminate, and a LED string formed by the LED devices 111 and 112 forms a parallel connection configuration with a LED string formed by the LED devices 113 and 114, and forms a parallel connection configuration with a LED string formed by the LED devices 115 and 116.

When the input voltage Vin of the LED array 110 is greater than 3 VF+VFD but less than the threshold voltage Vb3 of the constant current regulator 153, the constant current regulator 151 reduces the current i1 to be 0, the constant current regulator 152 reduces the current i2 to be 0, and the control circuit 160 turns on the switch 132 and turns off the switch 131 in the switch array 130, wherein 3 VF+VFD is greater than the threshold voltage Vb2 of the constant current regulator 152. As a result, the output current of the bridge rectifier 104 flows to the constant current regulator 153 through the LED devices 111, 112, and 113, and flows to the constant current regulator 156 through the LED devices 115 and 116. In this situation, the LED devices 111~113, 115, and 116 illuminate, and a LED string formed by the LED devices 111~113 forms a parallel connection configuration with the LED string formed by the LED devices 115 and 116.

When the input voltage Vin of the LED array 110 is greater than 4 VF+VFD but less than the threshold voltage Vb4 of the constant current regulator 154, the constant current regulator 151 reduces the current i1 to be 0, the constant current regulator 152 reduces the current i2 to be 0, the constant current regulator 153 reduces the current i3 to be 0, and the control circuit 160 turns on the switch 132 and turns off the switch 131 in the switch array 130, wherein 4 VF+VFD is greater than the threshold voltage Vb3 of the constant current regulator 153. As a result, the output current of the bridge rectifier 104 flows to the constant current regulator 154 through the LED devices 111, 112, 113, and 114, and flows to the constant current regulator 156 through the LED devices 115 and 116. In this situation, all of the LED devices 111~116 illuminate, and a LED string formed by the LED devices 111~114 forms a parallel connection configuration with the LED string formed by the LED devices 115 and 116.

When the input voltage Vin of the LED array 110 is greater than 5 VF+2 VFD but less than the threshold voltage Vb5 of the constant current regulator 155, the constant current regulator 151 reduces the current i1 to be 0, the constant current regulator 152 reduces the current i2 to be 0, the constant current regulator 153 reduces the current i3 to be 0, the constant current regulator 154 reduces the current i4 to be 0, and the control circuit 160 turns off the switch 131 and the switch 132 in the switch array 130, wherein 5 VF+2 VFD is greater than the threshold voltage Vb4 of the constant current regulator 154. As a result, the output current of the bridge rectifier 104 flows to the constant current regulator 155 through the LED devices 111, 112, 113, 114, and 115. In this situation, the LED devices 111~115 illuminate and form a series connection configuration.

When the input voltage Vin of the LED array 110 is greater than 6 VF+2 VFD but less than the threshold voltage Vb6 of the constant current regulator 156, the constant current regulators 151~155 reduce the currents i1~i5 to be 0, and the control circuit 160 turns off the switch 131 and the switch 132 in the switch array 130. As a result, the output current of the bridge rectifier 104 flows to the constant current regulator 156 through the LED devices 111, 112, 113, 114, 115, and 116. In this situation, all of the LED devices 111~116 illuminate and form a series connection configuration.

When the input voltage Vin of the LED array 110 gradually decreases, the driver circuit 140 performs the previous operations.

As can be appreciated from the foregoing descriptions that when the input voltage Vin of the LED array 110 is between VF~2 VF, the driver circuit 140 is capable of driving at least half of the LED devices in the LED array 110 to illuminate, rather than only a single LED device. When the input voltage Vin of the LED array 110 is between 2 VF~3 VF, the driver circuit 140 is capable of driving all of the LED devices in the LED array 110 to illuminate, rather than only two LED devices. When the input voltage Vin of the LED array 110 is between 3 VF~4 VF, the driver circuit 140 is capable of driving four LED devices in the LED array 110 to illuminate, rather than only three LED devices. When the input voltage Vin of the LED array 110 is between 4 VF~5 VF, the driver circuit 140 is capable of driving all of the LED devices in the LED array 110 to illuminate, rather than only four LED devices.

Apparently, the disclosed structure of the driver circuit 140 greatly improves the utilization rate of the LED devices in the LED array, so that the LED array 110 has superior luminous efficacy than other conventional structures in the case of employing the same amount of LED devices.

Additionally, as shown in FIG. 1, no electrolytic capacitor is arranged between the bridge rectifier 104 and the LED array 110. In addition, the aforementioned mechanism for stabilizing the current flowing through the LED devices by using the driver circuit 140 is beneficial to the durable time of the LED devices and also reduces flicker in LED devices. Accordingly, the aforementioned structure not only enables the luminance device 100 to have a greater power factor than the conventional luminance device in which the electrolytic capacitor is employed, but also increases the durable time and reliability of the luminance device 100.

As illustrated in the foregoing descriptions, in some embodiments, the control circuit 160 comprises the corresponding detection circuits for controlling the constant current regulator 156. In this situation, when the input voltage V6 of the constant current regulator 156 is increased to be greater than the threshold voltage Vb6, the constant current regulator 156 reduces the current i6 flowing through the constant current regulator 156 to be 0 under control of the corresponding detection circuit. In this situation, it is equivalent that the control circuit 160 in the driver circuit 140 provides an over voltage protection functionality to the entire LED array 110.

In some embodiments, when a temperature of a target constant current regulator in the constant current regulators 151~156 exceeds a threshold temperature, the target constant current regulator reduces the current flowing through the target constant current regulator under control of the control circuit 160.

Figure 3:
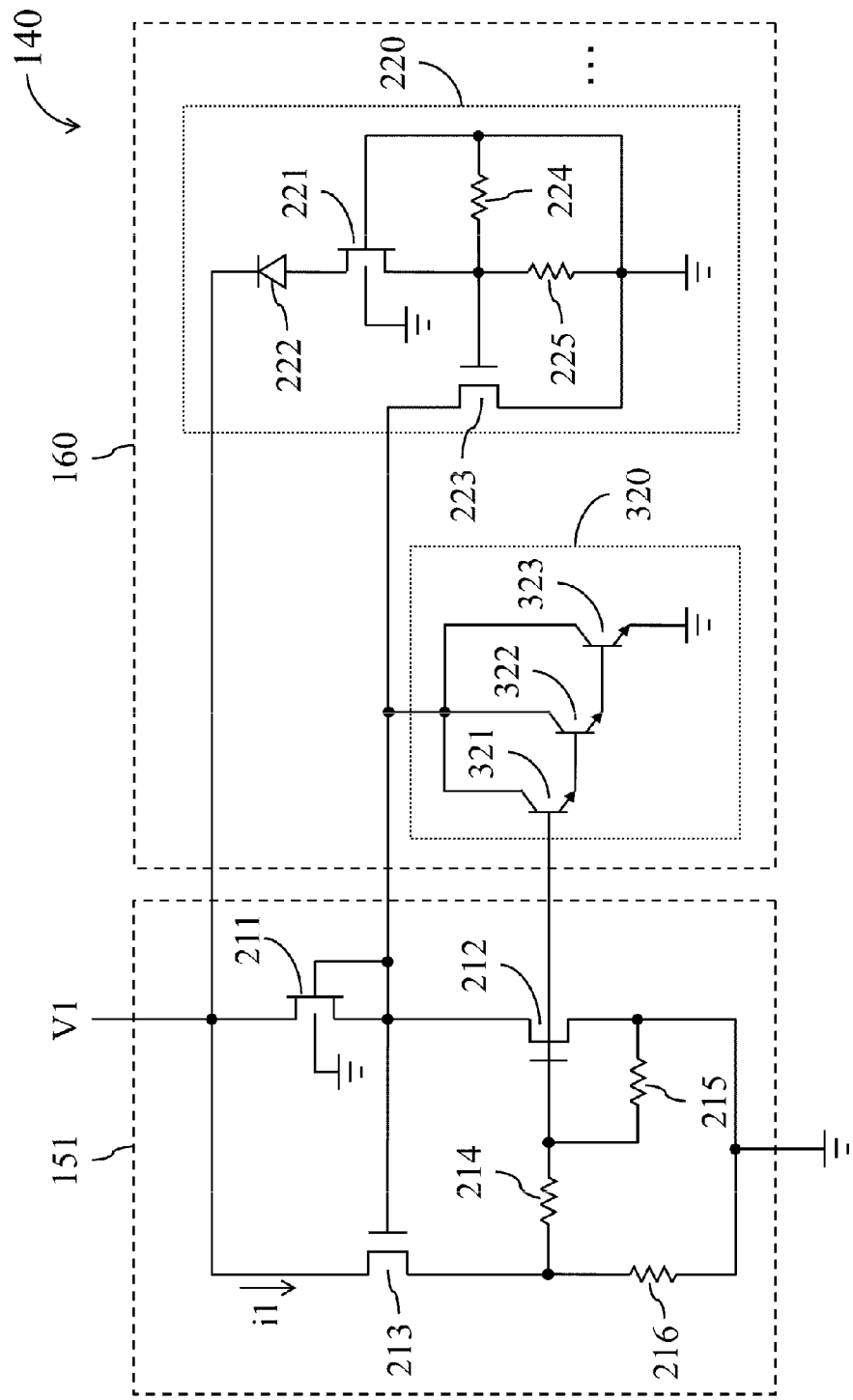
FIG. 3 is a partial functional block diagram of the driver circuit of FIG. 1 in accordance with another example embodiment.

For example, FIG. 3 shows a partial functional block diagram of the driver circuit 140 of FIG. 1 in accordance with another example. The driver circuit 140 in FIG. 3 is similar to the embodiment in the previous FIG. 2, and the difference between the two embodiments is that the control circuit 160 in FIG. 3 further comprises a plurality of over temperature protection circuits 320, respectively coupled with the constant current regulators 151~156 in the driver circuit 140, for providing an over temperature protection mechanism to the constant current regulators 151~156.

As shown in FIG. 3, the over temperature protection circuit 320 of the control circuit 160 for protecting the constant current regulator 151 comprises a sixth transistor 321, a seventh transistor 322, and an eighth transistor 323. A first terminal of the sixth transistor 321 is coupled with the control terminal of the third transistor 213 in the constant current regulator 151, and a control terminal of the sixth transistor 321 is coupled with the second terminal of the first transistor 214. A first terminal of the seventh transistor 322 is coupled with the control terminal of the third transistor 213, and a control terminal of the seventh transistor 322 is coupled with a second terminal of the sixth transistor 321. A first terminal of the eighth transistor 323 is coupled with the control terminal of the third transistor 213, and a control terminal of the eighth transistor 323 is coupled with a second terminal of the seventh transistor 322.

In the embodiment of FIG. 3, when the circuit temperature is less than the predetermined threshold temperature, a voltage across the resistor 216 in the constant current regulator 151 is determined by the voltage of the control terminal of the transistor 212. As the circuit temperature gradually increases, the voltage drop at the control terminal of the transistor 321 in the over temperature protection circuit 320 is greater than the voltage drop at the control terminal of the transistor 212 in the constant current regulator 151. Accordingly, when the circuit temperature increases to be greater than the predetermined threshold temperature, the voltage across the resistor 216 in the constant current regulator 151 is instead determined by the voltage of the control terminal of the transistor 321 in the over temperature protection circuit 320. As a result, the voltage across the resistor 216 would gradually decrease so that the current i1 flowing through the constant current regulator 151 correspondingly decreases, thereby achieving the over temperature protection functionality. In implementations, at least one or all of the transistors 321~323 in the over temperature protection circuit 320 may be realized with BJTs.

In implementations, other over temperature protection circuits of the control circuit 160 for protecting the constant current regulators 152~156 may be realized with the same structure as the previous over temperature protection circuit 320. The descriptions regarding the circuit operations between the constant current regulator 151 and the over temperature protection circuit 320 in FIG. 3 are also applicable to the constant current regulators 152~156 and the corresponding over temperature protection circuits. For simplicity, the descriptions will not be repeated here.

Additionally, corresponding over temperature protection circuits may only be employed for part of the constant current regulators 151~156 to reduce required circuit area. For example, in the control circuit 160, the over temperature protection circuits corresponding to the constant current regulators 151~155 may be omitted from the control circuit 160 while only the over temperature protection circuit for protecting the constant current regulator 156 is arranged in the control circuit 160.

Figure 4:
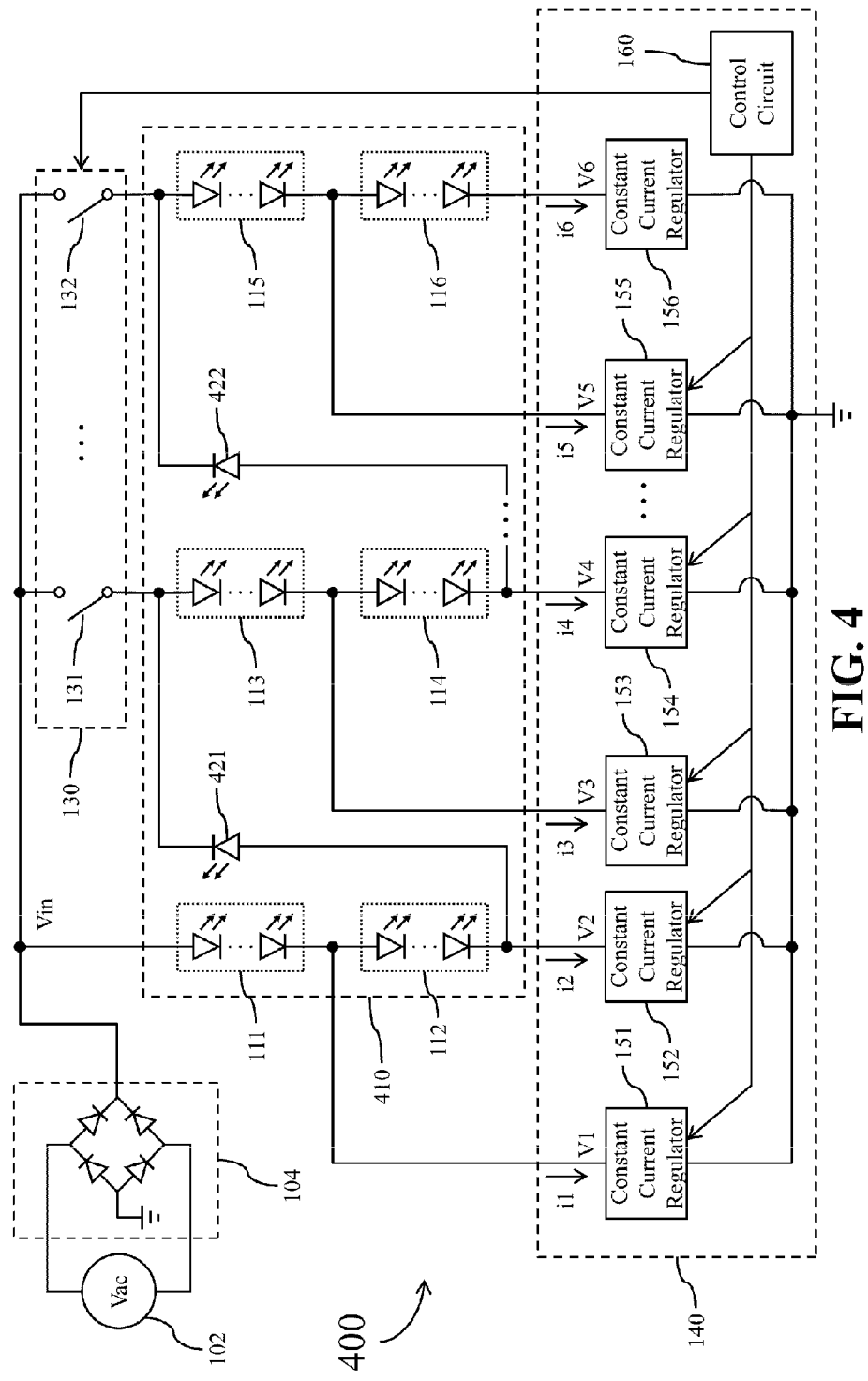
FIG. 4 is a simplified functional block diagram of the luminance device in accordance with another example embodiment.

FIG. 4 is a simplified functional block diagram of the luminance device 400 in accordance with another embodiment. The luminance device 400 is similar to the luminance device 100 of FIG. 1, and the difference between the two embodiments is that a LED array 410 of the luminance device 400 replaces the diode devices 121 and 122 of FIG. 1 with the LED devices 421 and 422. In implementations, both the LED devices 421 and 422 may be realized with one or more LED components. Since the LED devices 421 and 422 also have lighting ability, the structure of the luminance device 400 provides higher luminous performance when the driver circuit 140 drives the LED array 410 by utilizing the approaches described in the aforementioned embodiments.

The descriptions regarding the implementations, the operations, and the related advantages of other functional blocks of the luminance device 100 of FIG. 1 are also applicable to luminance device 400 of FIG. 4. For simplicity, the descriptions will not be repeated here.

In implementations, the switch array 130 of each of the aforementioned embodiments may be integrated into the LED array 110 or the LED array 410. Alternatively, the switch array 130 may be integrated into the driver circuit 140 of each of the aforementioned embodiments. Additionally, the constant current regulators 151~156 in the driver circuit 140 and the control circuit 160 described previously may be realized with other circuits having the same functions, and not restricted to the aforementioned embodiments of FIG. 2 and FIG. 3.

In practical applications, the circuit structures of the constant current regulators 151~156 described previously may be applied to other technical fields, and not restricted to the driver circuit of a LED module.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A driver circuit for driving a LED array, the LED array comprising: a first LED device, a second LED device, a third LED device, a fourth LED device, and a first diode device, wherein the second LED device is connected to the first LED device, the fourth LED device is connected to the third LED device, and the first diode device is connected between the second LED device and the third LED device, the driver circuit comprising:
- a first constant current regulator for coupling between the first LED device and the second LED device;
- a second constant current regulator for coupling between the second LED device and the third LED device;
- a third constant current regulator for coupling between the third LED device and the fourth LED device;
- a fourth constant current regulator for coupling between the fourth LED device and a fixed-voltage terminal; and
- a control circuit coupled with the first, the second, the third, and the fourth constant current regulators;
- wherein when an input voltage of a target constant current regulator of the first, the second, the third, and the fourth constant current regulators exceeds a corresponding threshold voltage, the target constant current regulator reduces a current flowing through the target constant current regulator to be lower than a predetermined threshold value under control of the control circuit.

2. The driver circuit of claim 1, wherein the target constant current regulator comprising:
- a first transistor, wherein a first terminal of the first transistor is coupled with the input terminal of the target constant current regulator;
- a second transistor, wherein a first terminal of the second transistor is coupled with a second terminal and a control terminal of the first transistor;
- a third transistor, wherein a first terminal of the third transistor is coupled with the first terminal of the first transistor, and a control terminal of the third transistor is coupled with the first terminal of the second transistor;
- a first resistor, wherein a first terminal of the first resistor is coupled with a second terminal of the third transistor, and a second terminal of the first resistor is coupled with a control terminal of the second transistor;
- a second resistor, wherein a first terminal of the second resistor is coupled with the control terminal of the second transistor, and a second terminal of the second resistor is coupled with a second terminal of the second transistor; and
- a third resistor, wherein a first terminal of the third resistor is coupled with the second terminal of the third transistor, and a second terminal of the third resistor is coupled with a fixed-voltage terminal.

3. The driver circuit of claim 2, wherein the control circuit turns off the third transistor when the input voltage of the target constant current regulator exceeds the corresponding threshold voltage.

4. The driver circuit of claim 3, wherein the control circuit comprises a detection circuit coupled with the target constant current regulator, and the detection circuit comprising:
- a fourth transistor;
- a third diode device comprising one or more diodes and coupled between a first terminal of the fourth transistor and the input voltage of the target constant current regulator;
- a fifth transistor, wherein a first terminal of the fifth transistor is coupled with the control terminal of the third transistor, and a control terminal of the fifth transistor is coupled with a second terminal of the fourth transistor;
- a fourth resistor, wherein a first terminal of the fourth resistor is coupled with the control terminal of the fifth transistor, and a second terminal of the fourth resistor is coupled with a control terminal of the fourth transistor; and
- a fifth resistor, wherein a first terminal of the fifth resistor is coupled with the control terminal of the fifth transistor, and a second terminal of the fifth resistor is coupled with a fixed-voltage terminal;
- wherein the corresponding threshold voltage of the target constant current regulator is determined by a breakdown voltage of the third diode device.

5. The driver circuit of claim 4, wherein the control circuit comprises a plurality of detection circuits respectively coupled with the first, the second, and the third constant current regulators.

6. The driver circuit of claim 5, wherein when a temperature of the target constant current regulator exceeds a threshold temperature, the target constant current regulator reduces the current flowing through the target constant current regulator under control of the control circuit.

7. The driver circuit of claim 6, wherein the control circuit reduces the current flowing through the target constant current regulator by reducing a voltage across the third resistor.

8. The driver circuit of claim 7, wherein the control circuit comprises an over temperature protection circuit coupled with the target constant current regulator, and the over temperature protection circuit comprising:
- a sixth transistor, wherein a first terminal of the sixth transistor is coupled with the control terminal of the third transistor, and a control terminal of the sixth transistor is coupled with the second terminal of the first transistor;
- a seventh transistor, wherein a first terminal of the seventh transistor is coupled with the control terminal of the third transistor, and a control terminal of the seventh transistor is coupled with a second terminal of the sixth transistor; and
- an eighth transistor, wherein a first terminal of the eighth transistor is coupled with the control terminal of the third transistor, and a control terminal of the eighth transistor is coupled with a second terminal of the seventh transistor.

9. The driver circuit of claim 8, wherein at less one of the sixth, the seventh, and the eighth transistors is a bipolar junction transistor.

10. The driver circuit of claim 2, wherein the LED array comprises a first switch connected between the third LED device and the first LED device, and when an input voltage of the LED array is between a second threshold voltage and a third threshold voltage, the control circuit turns off the first switch.

11. The driver circuit of claim 2, further comprising:
- a first switch for coupling between the third LED device and the first LED device;
- wherein when an input voltage of the LED array is between a second threshold voltage and a third threshold voltage, the control circuit turns off the first switch.

12. The driver circuit of claim 1, wherein the control circuit comprises a detection circuit coupled with the target constant current regulator, and the detection circuit comprising:
- a fourth transistor;
- a third diode device comprising one or more diodes and coupled between a first terminal of the fourth transistor and the input voltage of the target constant current regulator;
- a fifth transistor, wherein a first terminal of the fifth transistor is coupled with the target constant current regulator, and a control terminal of the fifth transistor is coupled with a second terminal of the fourth transistor;

a fourth resistor, wherein a first terminal of the fourth resistor is coupled with the control terminal of the fifth transistor, and a second terminal of the fourth resistor is coupled with a control terminal of the fourth transistor; and a fifth resistor, wherein a first terminal of the fifth resistor is coupled with the control terminal of the fifth transistor, and a second terminal of the fifth resistor is coupled with a fixed-voltage terminal;

wherein the corresponding threshold voltage of the target constant current regulator is determined by a breakdown voltage of the third diode device, and when the input voltage of the target constant current regulator exceeds the corresponding threshold voltage, the target constant current regulator reduces the current flowing through the target constant current regulator to be lower than the predetermined threshold value under control of the first terminal of the fifth transistor.

13. The driver circuit of claim 12, wherein the control circuit comprises a plurality of detection circuits respectively coupled with the first, the second, and the third constant current regulators.

14. The driver circuit of claim 13, wherein when a temperature of the target constant current regulator exceeds a threshold temperature, the target constant current regulator reduces the current flowing through the target constant current regulator under control of the control circuit.

15. The driver circuit of claim 12, wherein the LED array comprises a first switch connected between the third LED device and the first LED device, and when an input voltage of the LED array is between a second threshold voltage and a third threshold voltage, the control circuit turns off the first switch.

16. The driver circuit of claim 15, wherein the control circuit switches a configuration of the first, the second, the third, and the fourth LED devices between a parallel connection configuration and a series connection configuration by controlling operations of the first switch.

17. The driver circuit of claim 12, further comprising:
a first switch for coupling between the third LED device and the first LED device;
wherein when an input voltage of the LED array is between a second threshold voltage and a third threshold voltage, the control circuit turns off the first switch.

18. The driver circuit of claim 17, wherein the control circuit switches a configuration of the first, the second, the third, and the fourth LED devices between a parallel connection configuration and a series connection configuration by controlling operations of the first switch.

19. The driver circuit of claim 1, wherein the LED array further comprises a fifth LED device, a sixth LED device, and a second diode device, wherein the sixth LED device is connected to the fifth LED device, and the second diode device is connected between the fifth LED device and another LED device of the LED array, the driver circuit further comprising:
a fifth constant current regulator for coupling between the fifth LED device and the sixth LED device, and when an input voltage of the fifth constant current regulator exceeds a fifth threshold voltage, the fifth constant current regulator reduces a current flowing through the fifth constant current regulator to be lower than the predetermined threshold value under control of the control circuit; and
a sixth constant current regulator for coupling between the sixth LED device and a fixed-voltage terminal, and when an input voltage of the sixth constant current regulator exceeds a sixth threshold voltage, the sixth constant current regulator reduces a current flowing through the sixth constant current regulator to be lower than the predetermined threshold value under control of the control circuit.

20. The driver circuit of claim 19, wherein the LED array further comprises a first switch and a second switch, the first switch is connected between the third LED device and the first LED device, and the second switch is connected between the fifth LED device and the first LED device;
wherein when an input voltage of the LED array is between a second threshold voltage and a third threshold voltage, the control circuit turns off the first switch, and when the input voltage of the LED array is between a fourth threshold voltage and a fifth threshold voltage, the control circuit turns off the second switch.

21. The driver circuit of claim 20, wherein the control circuit switches a configuration of the first, the second, the third, the fourth, the fifth, and the sixth LED devices between a parallel connection configuration and a series connection configuration by controlling operations of the first switch and the second switch.

22. The driver circuit of claim 19, further comprising:
a first switch for coupling between the third LED device and the first LED device; and
a second switch for coupling between the fifth LED device and the first LED device;
wherein when an input voltage of the LED array is between a second threshold voltage and a third threshold voltage, the control circuit turns off the first switch, and when the input voltage of the LED array is between a fourth threshold voltage and a fifth threshold voltage, the control circuit turns off the second switch.

23. The driver circuit of claim 22, wherein the control circuit switches a configuration of the first, the second, the third, the fourth, the fifth, and the sixth LED devices between a parallel connection configuration and a series connection configuration by controlling operations of the first switch and the second switch.

24. A driver circuit for driving a LED array, the LED array comprising: a first LED device, a second LED device, a third LED device, a fourth LED device, a first diode device, and a first switch, wherein the second LED device is connected to the first LED device, the fourth LED device is connected to the third LED device, the first diode device is connected between the second LED device and the third LED device, and the first switch is connected between the third LED device and the first LED device, the driver circuit comprising:
a first constant current regulator for coupling between the first LED device and the second LED device;
a second constant current regulator for coupling between the second LED device and the third LED device;
a third constant current regulator for coupling between the third LED device and the fourth LED device;
a fourth constant current regulator for coupling between the fourth LED device and a fixed-voltage terminal; and
a control circuit coupled with the first, the second, the third, and the fourth constant current regulators;
wherein when an input voltage of a target constant current regulator of the first, the second, the third, and the fourth constant current regulators exceeds a corresponding threshold voltage, the target constant current regulator reduces a current flowing through the target constant current regulator to be lower than a predetermined threshold value under control of the control circuit, and when an input voltage of the LED array is between a second threshold voltage and a third threshold voltage, the control circuit turns off the first switch.

25. The driver circuit of claim 24, wherein the control circuit switches a configuration of the first, the second, the third, and the fourth LED devices between a parallel connection configuration and a series connection configuration by controlling operations of the first switch.

26. A driver circuit for driving a LED array, the LED array comprising: a first LED device, a second LED device, a third LED device, a fourth LED device, and a first diode device, wherein the second LED device is connected to the first LED device, the fourth LED device is connected to the third LED device, and the first diode device is connected between the second LED device and the third LED device, the driver circuit comprising:
- a first switch for coupling between the third LED device and the first LED device;
- a first constant current regulator for coupling between the first LED device and the second LED device;
- a second constant current regulator for coupling between the second LED device and the third LED device;
- a third constant current regulator for coupling between the third LED device and the fourth LED device;
- a fourth constant current regulator for coupling between the fourth LED device and a fixed-voltage terminal; and
- a control circuit coupled with the first, the second, the third, and the fourth constant current regulators;
wherein when an input voltage of a target constant current regulator of the first, the second, the third, and the fourth constant current regulators exceeds a corresponding threshold voltage, the target constant current regulator reduces a current flowing through the target constant current regulator to be lower than a predetermined threshold value under control of the control circuit, and when an input voltage of the LED array is between a second threshold voltage and a third threshold voltage, the control circuit turns off the first switch.

27. The driver circuit of claim 26, wherein the control circuit switches a configuration of the first, the second, the third, and the fourth LED devices between a parallel connection configuration and a series connection configuration by controlling operations of the first switch.

* * * * *